No. 745,863. PATENTED DEC. 1, 1903.
J. T. C. KESSMEIER.
METHOD OF MELTING GLASS.
APPLICATION FILED NOV. 14, 1902.
NO MODEL.
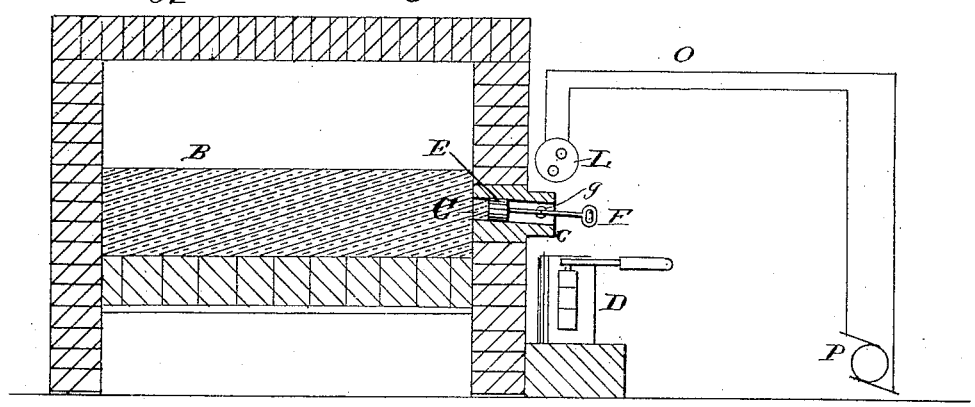
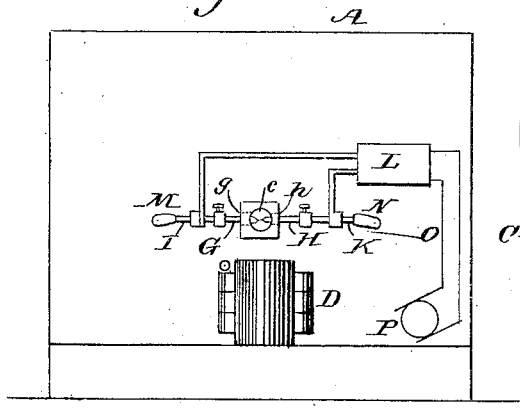
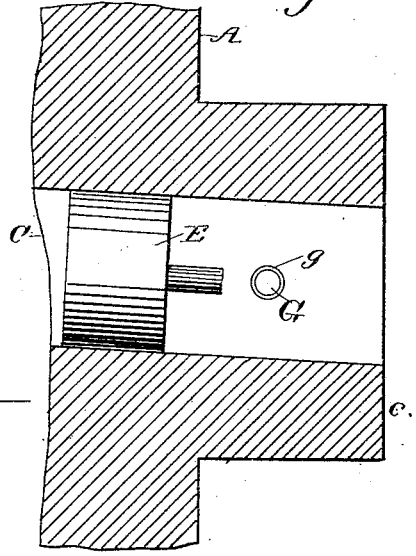
WITNESSES:
Julius T. C. Kessmeier INVENTOR
BY
Connolly Bros.
ATTORNEYS.

No. 745,863. Patented December 1, 1903.

UNITED STATES PATENT OFFICE.

JULIUS T. C. KESSMEIER, OF WASHINGTON, PENNSYLVANIA.

METHOD OF MELTING GLASS.

SPECIFICATION forming part of Letters Patent No. 745,863, dated December 1, 1903.

Application filed November 14, 1902. Serial No. 131,415. (No model.)

*To all whom it may concern:*

Be it known that I, JULIUS T. C. KESSMEIER, a citizen of the United States, residing at Washington, in the county of Washington and State of Pennsylvania, have invented certain new and useful Improvements in Methods of Melting Glass; and I do hereby declare the following to be a full, clear, and exact description of the invention, such as will enable others skilled in the art to which it appertains to make and use the same.

My invention has relation to methods of melting glass, and has for its object the provision of novel means whereby glass may be rendered so soft and fluid that it can be made to flow from a tank or furnace into molds having deep and narrow cavities, whereby articles may be cast which it has heretofore been impossible to produce by that process.

The formation of glass articles by casting has heretofore been extremely limited owing to the impossibility of reducing the glass to a condition in which it would flow into deep or narrow cavities, and where the casting of glass has been practiced it has been confined to the production of solid or thick walled masses.

My invention is based on the discovery that glass when heated to a degree sufficient to render it soft is a conductor of electricity and that if a mass of soft glass be interposed between the ends of conductors constituting the terminals of an electric circuit through which is passing an electric current of sufficient quantity and intensity to create an arc the glass in its molten condition will conduct the current across from one terminal to the other, and in its passage the current will heat the glass to such a high degree that the glass will become very soft and fluid.

In carrying my invention into effect I melt the glass in a tank, furnace, pot, or other suitable receptacle by means of the heat derived from burning fuel and allow it to flow from the receptacle in which it has been melted and superheat it to a very high degree—say 3,500° Fahrenheit or more—as it flows by means of an electric current, so that it will reach the molds or other devices in which it is to be cast in a state of extreme fluidity, and so that it will run into the cavities in which it is to assume the solid form after the manner of molten metal.

In the accompanying drawings, Figure 1 is a vertical sectional view of a glass tank or furnace furnished with the appliances necessary for carrying my invention into effect. Fig. 2 is a front elevation of the same; and Fig. 3 a detail view, on an enlarged scale, of a part of the same.

A designates the tank or furnace which may be of the usual or any desired form and is supplied with the ordinary means for heating it from burning fuel and supplying it with material to be made into glass.

B designates the molten glass within the furnace A, and C a conduit through which the molten glass is allowed to flow to a mold D beneath the outer end of the conduit. The conduit C, which may be, as shown, merely an orifice in the wall of the furnace A, with an extension $c$ beyond the outer side of the wall, opens into the furnace below the level of the mass of glass B, and when the glass is not flowing through the conduit the latter is closed by a plug E, of fire-brick or other suitable material, which is provided with a handle F.

The extension $c$ of conduit C is formed with holes $g$ $h$, through which pass carbons G H, which are held in carbon rods I K, that form a part of the mechanism by means of which the carbons are fed toward one another as they are consumed, such mechanism being contained within a case L and being the same in construction and operation as that of an electric-arc lamp, and hence not necessary to describe. The carbon rods are loosely clamped in the mechanism by which they are fed and are provided with handles M N, of insulating material, by means of which the rods may be moved toward or from one another to establish an arc, as will be hereinafter described. An electric conductor O conveys current to the carbons from a generator P, such current being approximately five amperes at three hundred volts for each square millimeter of electrode-surface.

Operation: The tank A being charged with glass, which is kept in the ordinary molten condition by the heat from burning fuel, when a casting is to be made or the glass is to be drawn from the tank for any other purpose the plug E is withdrawn from the conduit C and the carbons G H are brought together and separated, so as to form an arc. The glass as it flows through the conduit will come into contact with the carbons and being while in a molten condition an electric conductor will conduct the current across from one carbon to the other and the current in its passage through the glass will superheat the same and render it extremely soft, so that it will flow into the molds much in the manner of molten metal. When sufficient glass has been drawn off in the manner above described, the carbons are separated a sufficient distance to permit the passage of plug E, which is inserted in the cavity, so as to cut off the flow of glass until such time as another casting is to be made.

Instead of flowing the glass directly into molds it may be allowed to flow into ladles or other receptacles and poured from them into molds or onto tables; but I prefer to flow it directly into the molds, as by this course the extreme fluidity produced by the electric superheating is utilized to the best advantage.

The mechanism for feeding the carbons toward one another accordingly as they are consumed will only be necessary when very large castings are to be made or when the molds are being filled in rapid succession, as the arc will be maintained for considerable time before the carbons are consumed to such an extent as to break it.

Having described my invention, I claim—

1. The method of melting glass to reduce it to a fluid condition and delivering it to molds, consisting in subjecting a mass of it to a preparatory melting by the heat derived from burning fuel and then superheating that portion of the molten glass which flows through the tap-hole by means of an electric current.

2. The method of melting glass to reduce it to a fluid condition and deliver it to molds, consisting in subjecting a mass of glass to a preparatory melting heat in a suitable furnace, causing it to flow intermittently through a tap-hole to molds and superheating that portion of the molten glass which flows through the tap-hole by means of an electric current.

In testimony whereof I have affixed my signature in presence of two witnesses.

JULIUS T. C. KESSMEIER.

Witnesses:
JOS. B. CONNOLLY,
A. A. CONNOLLY.